US005596316A

United States Patent [19]

Honeck

[11] Patent Number: 5,596,316

[45] Date of Patent: Jan. 21, 1997

[54] PASSIVE VISOR ANTENNA

[75] Inventor: Brian S. Honeck, Holland, Mich.

[73] Assignee: Prince Corporation, Holland, Mich.

[21] Appl. No.: 412,970

[22] Filed: Mar. 29, 1995

[51] Int. Cl.$^6$ .................. H04Q 7/00

[52] U.S. Cl. .................. 340/825.030; 340/825.690; 343/713

[58] Field of Search .................. 340/825.03, 825.22, 340/825.69, 825.72; 341/176; 343/711, 713, 803, 833, 834, 700 MS; 455/151.2, 99; 296/97.5; 348/723; H01Q 1/32

[56] References Cited

U.S. PATENT DOCUMENTS

| | | | |
|---|---|---|---|
| 3,573,831 | 4/1971 | Forbes . | |
| 3,816,837 | 6/1974 | Smith . | |
| 3,896,448 | 7/1975 | Killen et al. . | |
| 3,926,470 | 12/1975 | Marcus | 296/97.5 |
| 4,247,850 | 1/1981 | Marcus | 340/826.69 |
| 4,275,916 | 6/1981 | Skogler | 296/97.5 |
| 4,370,658 | 1/1983 | Hill | 343/713 |
| 4,694,301 | 9/1987 | Wassum . | |
| 4,835,541 | 5/1989 | Johnson et al. . | |
| 4,905,270 | 2/1990 | Ono . | |
| 4,916,532 | 4/1990 | Streck et al. | 348/723 |
| 5,059,971 | 10/1991 | Blaese . | |
| 5,099,252 | 3/1992 | Bryant et al. . | |
| 5,155,494 | 10/1992 | Bryant et al. . | |
| 5,181,043 | 1/1993 | Cooper . | |
| 5,379,453 | 1/1995 | Tigwell | 455/151.2 |
| 5,442,340 | 8/1995 | Dykema | 340/825.22 |

FOREIGN PATENT DOCUMENTS

| | | | |
|---|---|---|---|
| 5-37219 | 2/1993 | Japan | H01Q 1/32 |
| WO91/00626 | 1/1991 | WIPO | H01Q 1/32 |

OTHER PUBLICATIONS

U.S. Patent Application Serial No. 07/567,390.

*Primary Examiner*—Edwin C. Holloway, III
*Attorney, Agent, or Firm*—Price, Heneveld, Cooper, DeWitt & Litton

[57] ABSTRACT

A visor or other vehicle housing of the present invention RF couples signals from a remote RF garage door opening transmitter located in a visor, for example, to a ¼ wave passive antenna, which in the preferred embodiment includes a thin foil strip extending along the longitudinal length of the visor. Such an antenna thereby creates an improved radiation pattern having improved radiation strength in the forward facing direction of the vehicle.

23 Claims, 3 Drawing Sheets

PASSIVE VISOR ANTENNA

BACKGROUND OF THE INVENTION

The present invention relates to a garage door opening remote transmitter antenna and particularly to a passive antenna mounted to a vehicle accessory, such as a visor.

Remote controlled garage door opening mechanisms have become nearly a standard feature for American homeowners. Such garage door opening mechanisms operate utilizing the transmission of a modulated RF frequency signal encoded for security. The signal is transmitted by a remote transmitter, which in the past has been pretuned to a corresponding frequency associated with the garage door opening receiver located in the garage. Such transmitters are typically portable and frequently are picked up and aimed in the direction of the garage door by the vehicle operator in order to control the garage door from an effective distance, allowing ingress of the vehicle as it approaches the garage.

With the revolution of the programmable, multi-channel garage door opening transmitter, which can be mounted in the vehicle visor, console or other permanent location when its in a vehicle and which can memorize the modulation scheme, frequency and any coding of any existent garage door opening transmitter, convenient and permanent mounting locations for such flexible transmitters are now available. When mounted in a vehicle visor or other convenient location in the vehicle, in some instances and in some vehicle designs, dead spots in the radiation pattern of the transmitter result such that the effective range of the transmitter is not what may otherwise be desired. Thus, although providing a convenient and permanent location for the garage door opening transmitter, such permanent mounting may, in some instances, have signals attenuated by, for example, the A-pillar in the vehicle such that blind spots exist in the use of the transmitter for opening a garage door. This problem manifests itself in the user's inability, for example, to open the garage door as the user approaches the end of the driveway so that the door is fully opened by the time the vehicle reaches the garage area. In order to overcome this problem, the predictability of the location of the transmitter in, for example, a visor was noted, and the passive antenna system of the present invention was created to dramatically improve the radiation pattern provided by such garage door opening transmitters.

SUMMARY OF THE INVENTION

The system of the present invention relies upon the RF (radio frequency) coupling of radio frequency energy from a remote RF garage door opening transmitter located in a visor, for example, to a ¼ wave passive antenna. In the preferred embodiment, this passive antenna comprises a thin conductive strip extending along the longitudinal length of a visor and is RF coupled to the RF output antenna of an existent RF transmitter also mounted within the body of the visor. Such an antenna thereby creates improved radiation strength in particularly the forward facing direction of the vehicle for actuation of RF operated garage door opening mechanisms, home lights and the like.

Systems embodying the present invention, therefore, comprise a housing having a built-in remote RF transmitter for actuating one or more remotely located accessories, such as a garage door, house lighting, etc. and a passive antenna mounted to the housing and RF coupled to the transmitter and oriented such that for a-given installation, the radiation pattern of the remote RF transmitter is enhanced.

As a result, both the convenience of providing a permanent and readily available location for an RF transmitter is provided, as well as a transmitter having a radiation pattern which is most effective for all directions of use. These and other features, objects and advantages of the present invention will become apparent upon reading the following description thereof together with reference to the accompanying drawings.

DETAILED DESCRIPTION OF THE PREFERRED EMBODIMENT

Figure 1:
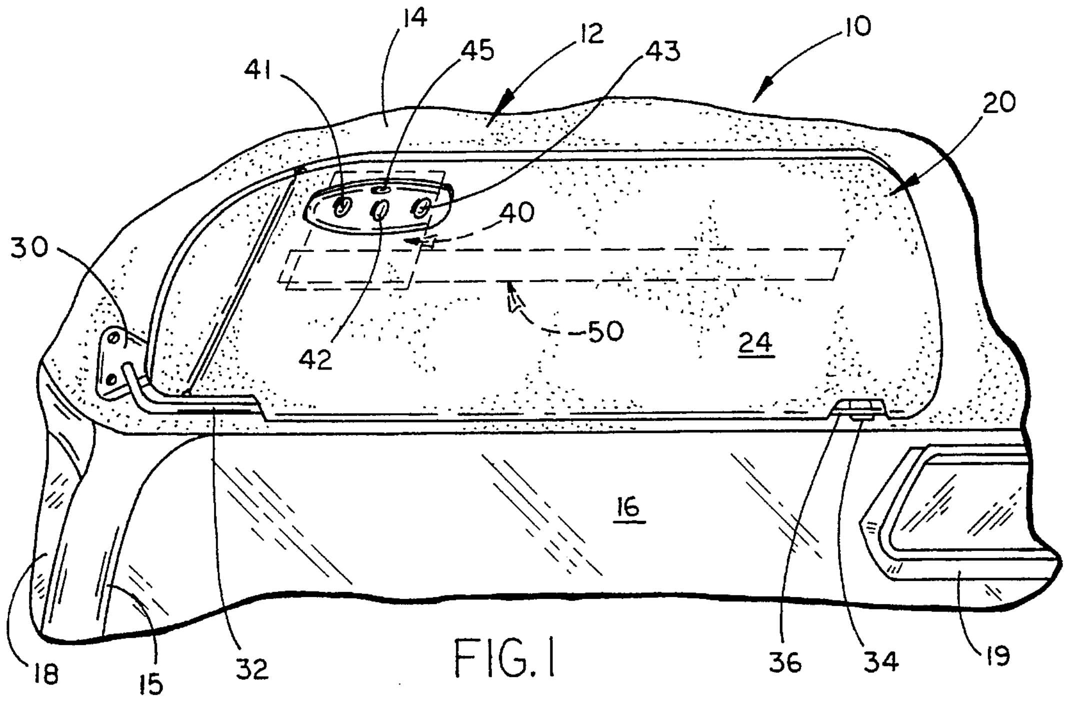
FIG. 1 is a fragmentary, perspective view of a vehicle having a visor embodying the present invention.

Referring initially to FIG. 1, there is shown a vehicle 10, such as an automobile, which includes a roof 12 of sheet-metal construction, to which a molded composite headliner 14 is mounted for providing attractive vehicle interior. Several pillars, including an A-pillar 15, provide support for the roof 12. Pillar 15 divides the windshield 16 from the driver's side window 18 of the vehicle. The vehicle typically will include a rearview mirror assembly 19 and a pair of visor assemblies with the driver's side visor 20 incorporating the present invention being shown.

Figure 2:
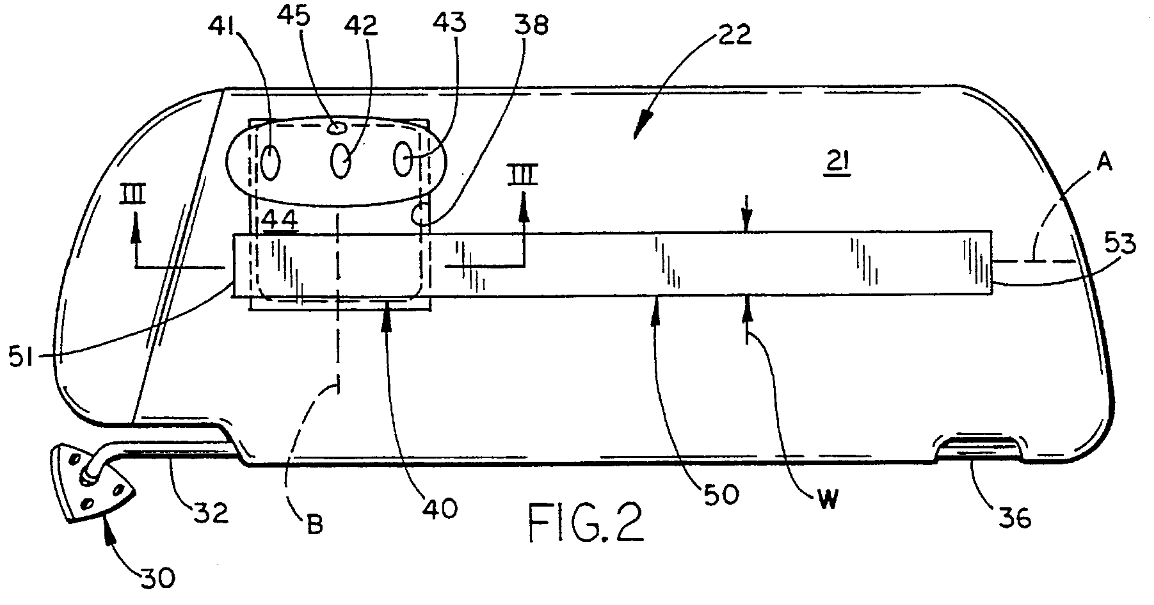
FIG. 2 is a front plan view of the visor with its outer upholstery material removed to more clearly show the present invention.

Visor assembly 20 comprises a visor body 22 (FIG. 2) which can be of a molded polymeric material such as polypropylene or other materials such as fiberboard which can be preformed in a butterfly shape and folded over in a clam-shell design to complete the visor body construction. The visor body is mounted to the vehicle roof 12 by means of an elbow bracket assembly 30, which can be of conventional construction and includes a pivot rod 32 extending into the body 22 of the visor. A torque fitting (not shown) mounted within the visor body engages the pivot rod 32 for allowing the visor to be held in a raised, stored position, as illustrated in FIGS. 1 and 2, to a number of lowered, use positions with the pivot mounting assembly 30 also allowing the visor to be moved from the front windshield position to the side window position in a conventional manner. A remote support clip 34 may be mounted to the roof near the rearview mirror 19 and receives and auxiliary visor rod 36 for supporting the end of the visor body 22 remote from pivot rod assembly 30 to the vehicle roof, as illustrated in FIG. 1.

Visor body 22 includes a pocket or recess 38 (FIG. 2) for receiving a re,note RF transmitter 40. Transmitter 40 can be of the type which recently has become extremely popular in both U.S. and foreign made automobiles and is of the type which can be trained to up to three ones of any existent RF transmitter employed for remotely controlling accessories, such as garage door opening mechanisms, home lights and the like. Such transmitter operates in training and operating modes in which, during training, an existent RF portable device which typically is carried loosely within the vehicle can be held in proximity to transmitter 40 which receives the frequency, modulation scheme and code of the transmitter, stores such information and subsequently can rebroadcast the learned RF signal information for any of three different existent transmitters. For such purpose, the programmable transmitter 40 includes first, second and third control switches 41, 42, 43, respectively, for controlling up to three different garage doors or other accessories, such as home lighting. The transmitter also includes an LED 45 which provides the vehicle operator with an indication for both training and operating the device. This revolutionary transmitter allows the vehicle owner to replace all of the existing transmitters employed within his or her home, which frequently includes multiple garage doors, and allows a single vehicle to control any one of the garage doors as well as interior home lighting. The transmitter is commercially available from Prince Corporation of Holland, Mich.

Each of the channels of the programmable transmitter 40 can operate in a frequency range of from 286 to 400 MHz with the power output being regulated by the Federal Communication Commission. It was discovered that positioning the programmable transmitter 40 in the visor provides an extremely convenient location for its use although it could also be mounted in a center console mounted above the rearview mirror assembly 19, if desired. The A-pillar 15 and sheet-metal roof, however, tend to interfere with the radiation of RF control signals to the receiver for the remotely controlled device. A uniform transmitted RF energy radiation pattern is difficult to obtain leading to, in some instance, blind spots in the transmission of garage door opening signals. It was serendipitously discovered that the addition of a passive antenna 50 directly to the outer surface 21 of visor body 22, as shown in FIG. 2, solved this problem and greatly improved the radiation pattern for the transmission of RF energy from the vehicle transmitter 40 to the receiver in the home or garage area.

Figure 3:
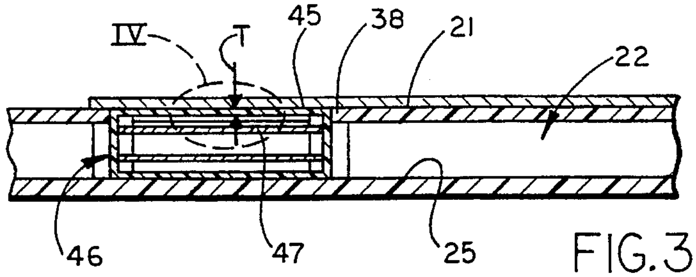
FIG. 3 is an enlarged, fragmentary, cross-sectional view taken along section lines III—III of FIG. 2.
Figure 4:
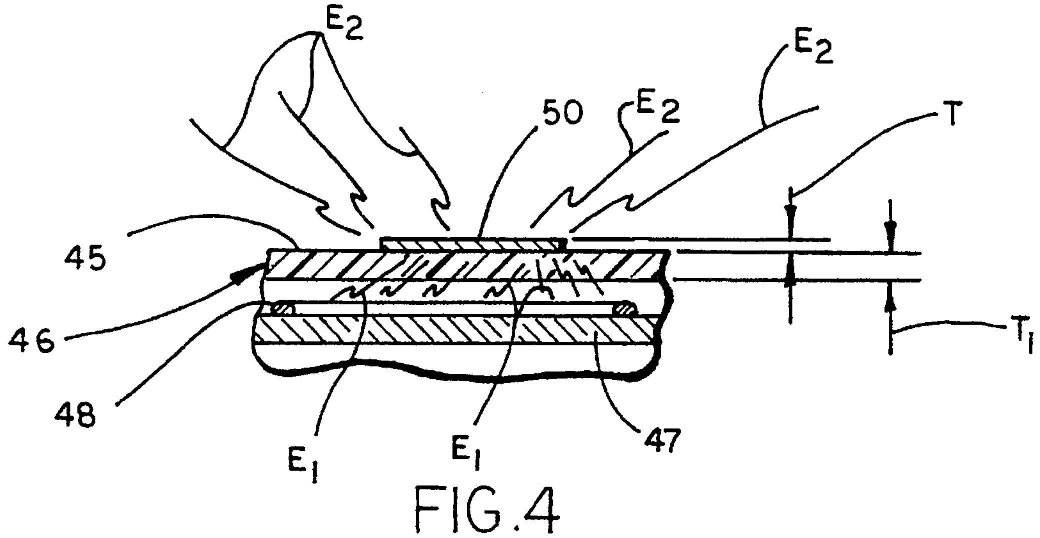
FIG. 4 is a greatly enlarged, cross-sectional view of the encircled area labeled by numeral IV in FIG. 3.

Visor 20 is covered by a suitable upholstery material 24, as seen in FIG. 1, to provide an attractive appearance to the visor which conforms to that of the vehicle interior. Upholstery material 24 covers the polymeric body 22 of the visor and the programmable transmitter 40, which is fixedly mounted within the pocket 38 of visor body 22. Transmitter 40 has an external surface 44 substantially flush with the surface 21 of visor body 22, as best seen in FIG. 3. The programmable transmitter 40 includes a rectangular housing 46 (FIG. 3), which can be adhered to the inner opposite surface 25 of visor body 22 by means of an adhesive material or be snap-fitted within the receiving pocket 38. Within the rectangular housing 46 of programmable transmitter 40 is a pair of circuit boards with the uppermost circuit board 47, as seen in FIGS. 3 and 4, including thereon a loop antenna 48 which is directly coupled to the RF output of the transmitter 40 for radiating RF energy therefrom for the operation of the garage door mechanism. Antenna 48 is, in the preferred embodiment, a rectangular loop antenna which is formed directly on the circuit board 47 as a conductive strip surrounding the boarder of the rectangular circuit board 47.

In order to enhance the radiation pattern and prevent blind spots in the radiation of the signal from transmitter 40 when in its transmitting mode, the passive antenna 50 of the present invention was created. In developing the effectiveness of the passive antenna 50, six variables were taken into consideration. First, the orientation of the passive antenna with respect to the loop antenna 48 was determined with the orthogonal orientation shown in FIGS. 2 and 4 by which the longitudinal axis A of antenna 50 was aligned at right angles to the longitudinal axis B of the rectangular loop antenna 48. The second determination was to orient the passive radiator 50 in direct proximity over the area of loop antenna 48, as shown in FIGS. 2, 3 and 4. Thirdly, it was determined that the passive radiator 50 should be at least a ¼ wave antenna in length at the lower frequency of 286 MHz. It also was determined that it should have a width from at least a ¼ inch to 2 inches. In the preferred embodiment, the width W (FIG. 2) was selected at 25.4 mm. Next, the thickness of the antenna was determined with a range of 0.008 to 0.040 inches being desirable. As the thickness of the material increased, the performance improves. As the thickness of the antenna increases, however, the passive radiator (i.e. antenna) becomes visible through the upholstery material 24. Thus, for aesthetic reasons, it is preferable to keep the antenna as thin as possible, and, in the preferred embodiment, it had a thickness T (FIG. 4) of 17 mils or 0.017 inches. The final factor in designing the passive radiator was the conductivity of the material with the more conductive metals, such as copper and aluminum being preferred. Although tin was tried, it was not as effective as aluminum. It was determined that an adhesive backed aluminum foil tape which is commercially available provided the desired dimensional and conductive characteristics for the passive radiator antenna 50.

The antenna tape was cut to provide a ¼ wavelength antenna at the low end and, in the preferred embodiment, had a length from its first end 51 to its remote end 53 (FIG. 2) of 263.5 mm. The material in the preferred embodiment was comprised of the commercially available sound damping tape Model No. 436 from the 3M Corporation and is purchased with a release paper backing such that it can be cut and applied directly to the polymeric surface 21 of the visor body 22 extending across and RF coupled to transmitter 40, as shown in FIG. 2. Thus, the ¼ wave antenna is end-fed by the loop antenna 48 of transmitter 40 with the tape extending directly across and engaging the outer surface 45 of transmitter housing 46. The thickness $T_1$ of the housing 46 (FIG. 3) is approximately 1.5 mm and the loop antenna 48 is substantially adjacent the internal surface of the wall 45 of the transmitter housing to provide effective coupling of RF energy $E_1$ (FIG. 4) from the directly coupled antenna 48 to the passive ¼ wave antenna 50. Antenna 50 then reradiates this modulated and encoded RF energy as signal $E_2$ (FIG. 4). During assembly, upon manufacture of the visor body and prior to its upholstery, transmitter 40 is positioned in place and the passive radiating tape 50 is placed in alignment over and engaging surface 45 of transmitter 40 and visor body surface 21, as shown in FIGS. 2–4. The resultant improvement in radiation is illustrated by the polar waveform diagrams of FIGS. 5–7, which are radiation polar diagrams showing the front of the vehicle at 0°, the rear of the vehicle at 180° and the relative angle or location of the vehicle represented by the relative angular spacing. The distance from the center of the diagrams represents the distance in feet from the vehicle at which a receiver is reliably operated by the transmitter. All test shown were of a transmitter 40 mounted in the driver's side visor, as seen in FIG. 1, with the visor mounted in a 1995 Jeep Grand Cherokee vehicle.

Figure 5:
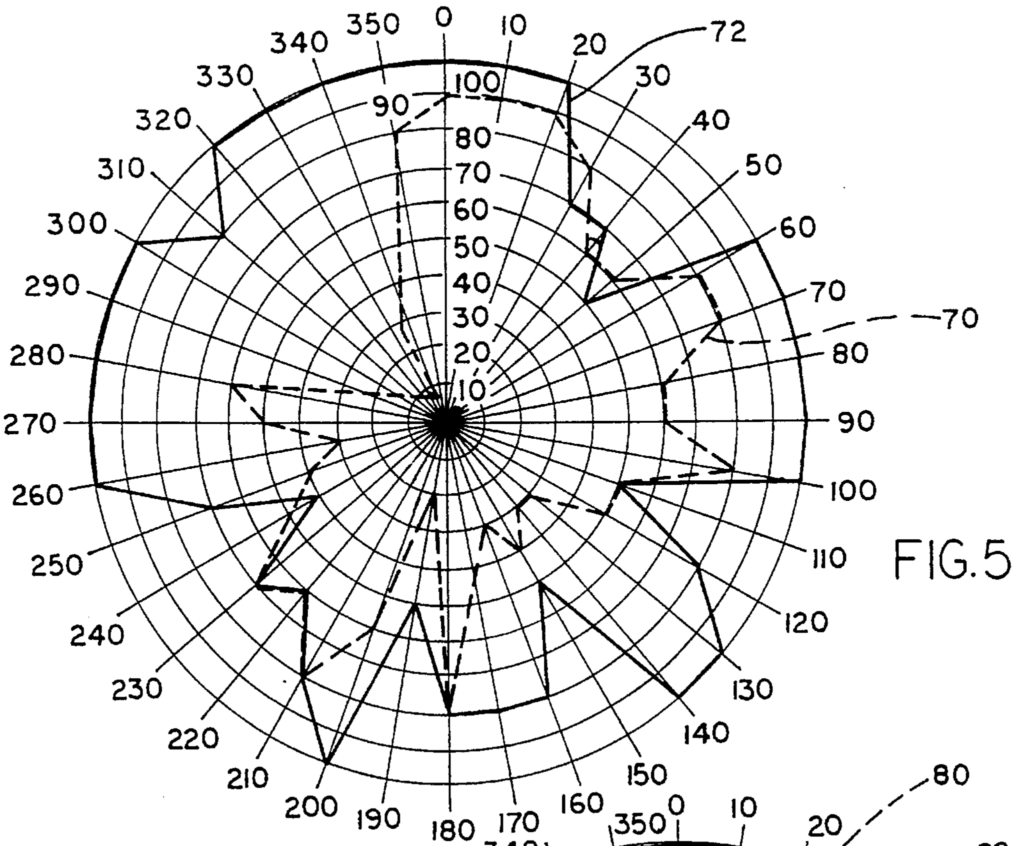
FIG. 5 is a polar radiation pattern diagram for a first frequency and modulation type of RF transmitter shown both with and without the passive antenna of the present invention.

In FIG. 5, a Pulsar brand remote garage door opening transmitter operating at a frequency of 288 MHz was employed to program a programmable transmitter 40. In the dash line waveform diagram 70, the resultant operation is shown without the passive radiator antenna 50. As shown by the polar diagram 70, a substantial hole exists between angular spacing 250° and 350° due primarily to the location of the A-pillar. When approaching one's driveway from the left, as can be appreciated, this hole in the radiation pattern can prevent operation of the garage door opener as the vehicle approaches the end of the driveway. With the addition of the passive radiator antenna 50, the solid line waveform diagram 72 was obtained and, as can be seen, provides a greatly enhanced performance particularly in the critical 260° through 220° directions to greatly enhance the performance of the transmitter utilizing the modulation scheme, frequency and coding associated with the Pulsar system.

Figure 6:
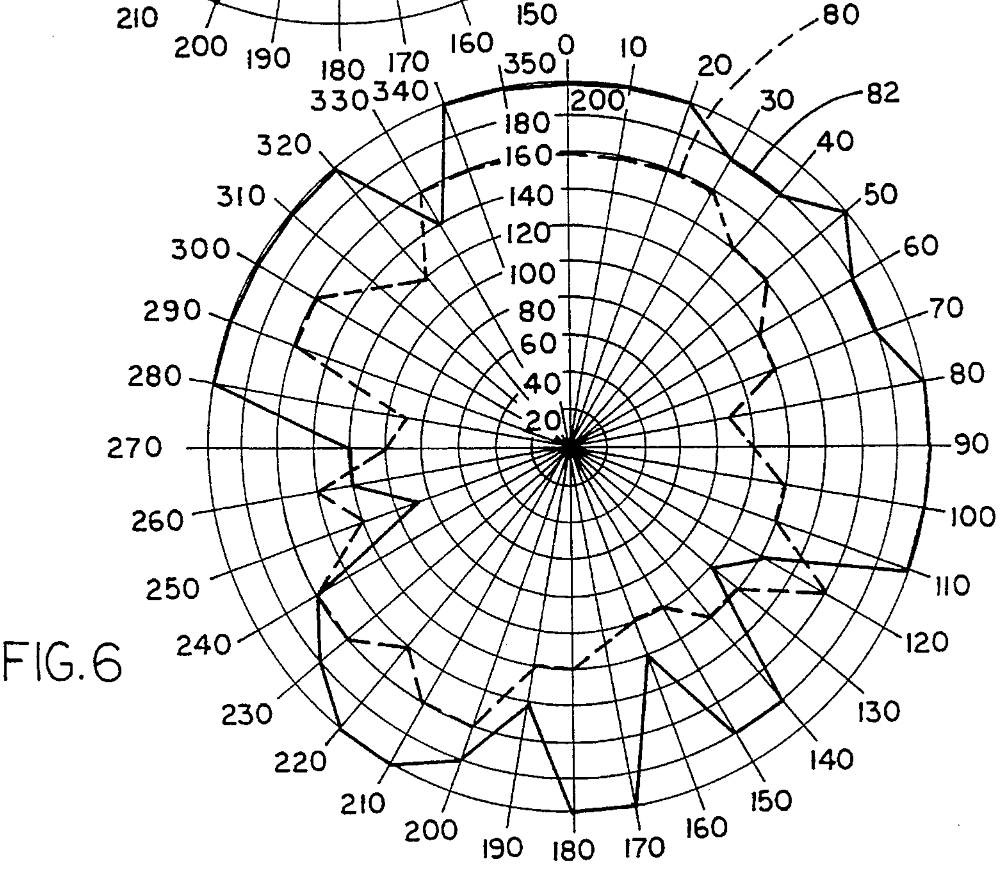
FIG. 6 is a polar radiation pattern diagram for a second frequency and modulation type of a second RF transmitter shown both with and without the passive antenna of the present invention.

FIG. 6 shows the similar improved results obtained when a Multi-code brand transmitter operating at 300 MHz was employed to train transmitter 40 in the visor body 22. The resultant radiation pattern 80 shown in dashed lines for transmitter 40 without antenna 50 and the enhanced performance shown by the solid lines 82 showing the improved performance utilizing the passive antenna 50 of the present invention.

Figure 7:
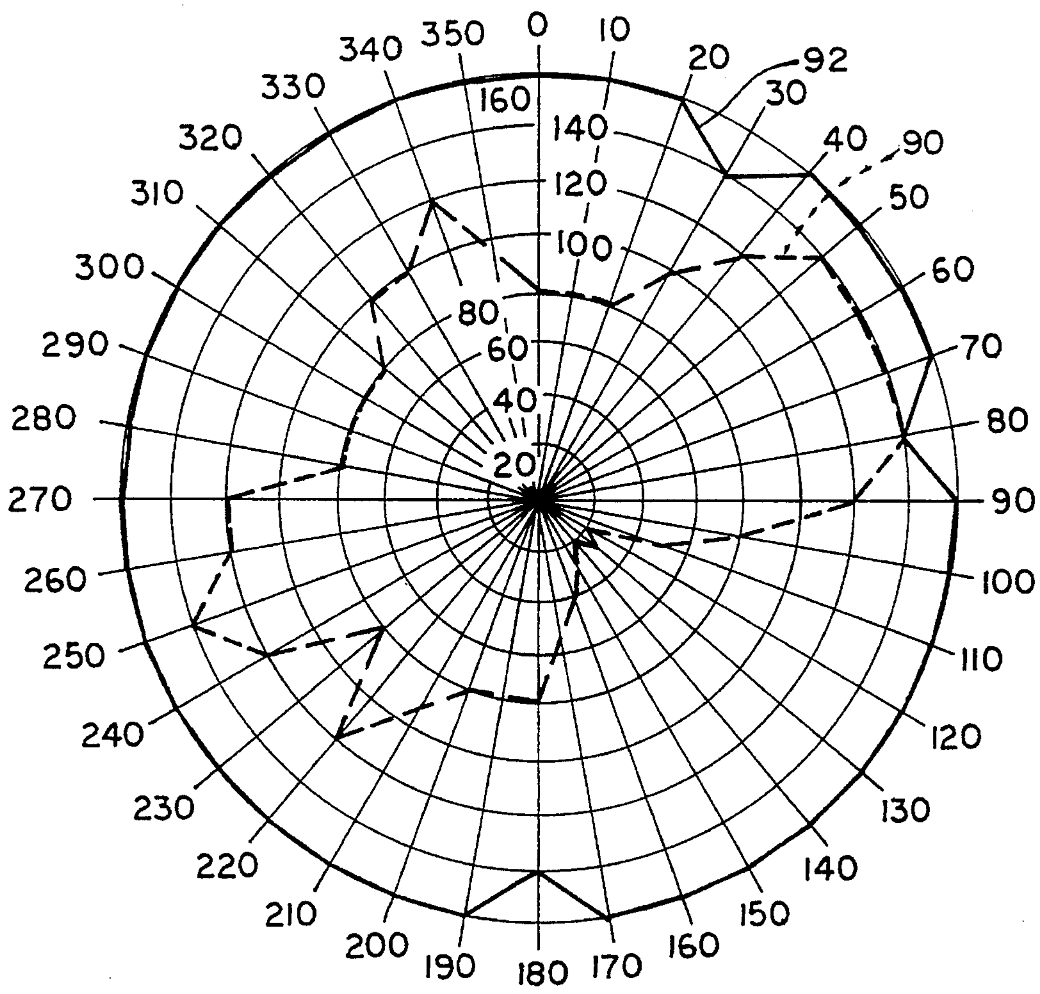
FIG. 7 is a polar radiation pattern diagram for a third frequency and modulation type of a third RF transmitter shown both with and without the passive antenna of the present invention.

Finally, the waveform diagram of FIG. 7 shows the radiation pattern 90 when a Genie brand transmitter operating at a frequency of 390 MHz is employed to train programmable transmitter 40. Dashed line waveform 90 shows the effectiveness of transmitter 40 without antenna 50 and the enhanced performance is represented by solid line waveform diagram 92 mounted in the same visor location utilizing the passive radiator 50 of the present invention. In this diagram, the radiation pattern is nearly doubled for substantially half of the entire waveform diagram.

The dramatic results represented by the improved radiation patterns were accomplished by the recognition of the problem together with the creative design of the passive radiator 50 at an extremely economical cost, recognizing that a foil tape employed for an entirely different application could be employed and mounted directly to the visor body in a predetermined orientation to the existent transmitter housing for providing the enhanced radiation performance. The serendipitous discovery of not only the utilization of this relatively inexpensive material but also the recognition of the problem being the A-pillar or other vehicle body parts led to this unique solution which greatly enhances the performance of the transmitter 40. Although the preferred embodiment of the invention and its initial application is in the visor of the preferred embodiment, it will be appreciated by those skilled in the art that the passive radiator may be mounted to a transmitter located in other areas, such as an overhead console, where the housing permits the orientation of an end-fed ¼ wave antenna to the transmitter. Although a programmable transmitter 40 of the type which is commercially available was employed in the preferred embodiment, a nonprogrammable conventional remote controlling RF transmitter could also be installed in or to a vehicle housing such as a visor and likewise have its radiation effectiveness enhanced by the passive antenna of the present invention.

These and other modifications to the preferred embodiment of the present invention will become apparent to those skilled in the art, but will fall within the spirit and scope of the invention as defined by the appended claims.

The embodiments of the invention in which an exclusive property or privilege is claimed are defined as follows:

1. A vehicle visor comprising:

a visor body having an exterior surface, said body including a recess for receiving an RF transmitter;

a strip of conductive material mounted to said exterior surface of said visor body in proximity to said recess for defining a passive radiator; and an upholstery covering said visor body and strip of conductive material.

2. The visor as defined in claim 1 wherein said strip extends across said recess.

3. The visor as defined in claim 2 wherein said strip is adhesively attached to said exterior surface of said visor body.

4. The visor as defined in claim 3 wherein said strip extends along the longitudinal axis of said visor body.

5. The visor as defined in claim 4 wherein said strip comprises aluminum tape.

6. The visor as defined in claim 5 wherein said tape has a width of from about ½ to 2 inches.

7. The visor as defined in claim 6 wherein said tape has a thickness of from about 0.008 to 0.040 inches.

8. The visor as defined in claim 1 wherein said strip is cut to a length corresponding to ¼ wavelength of RF energy at a frequency of about 286 MHz.

9. The visor as defined in claim 1 and further including an RF transmitter positioned in said recess.

10. The visor as defined in claim 1 and including a transmitter positioned in said recess, said transmitter being programmable to the RF frequency, modulation scheme and code of an existent remote control RF transmitter employed for actuating garage door opening mechanisms.

11. The visor as defined in claim 10 wherein said transmitter includes three separately programmable channels.

12. A vehicle visor and a passive antenna comprising:

a visor body having an exterior surface, said body including a bracket for mounting said visor body to a vehicle;

an RF transmitter mounted to said visor body and including a built-in antenna;

a passive radiating antenna mounted to said exterior surface of said visor body and RF coupled to said built-in antenna of said transmitter; and an upholstery covering said visor body and strip of conductive material.

13. The visor as defined in claim 12 wherein said passive radiator comprises a ¼ wavelength antenna for the frequency of said RF transmitter.

14. The visor as defined in claim 13 wherein said visor body includes a recess for receiving said transmitter.

15. The visor as defined in claim 14 wherein said RF transmitter includes a generally rectangular housing having an outer surface substantially flush with said exterior surface of said visor when said housing is mounted within said visor recess.

16. The visor as defined in claim 15 wherein said antenna comprises a strip of conductive material adhesively attached to the surface of said visor body and extending along the longitudinal axis of said visor body.

17. The visor as defined in claim 16 wherein said antenna extends in a direction orthogonal to the longitudinal axis of said transmitter housing.

18. The visor as defined in claim 17 wherein said antenna comprises aluminum tape.

19. The visor as defined in claim 18 wherein said tape has a width of from about ½ to 2 inches.

20. The visor as defined in claim 19 wherein said tape has a thickness of from about 0.008 to 0.040 inches.

21. The visor as defined in claim 20 wherein said transmitter is a programmable RF frequency transmitter.

22. The visor as defined in claim 21 wherein said transmitter is programmable to the RF frequency, modulation scheme and code of an existent remote control transmitter employed for actuating garage door opening mechanisms.

23. The visor as defined in claim 22 wherein said transmitter includes three separately programmable channels.

* * * * *